United States Patent [19]

Rostoker et al.

[11] 4,038,264
[45] July 26, 1977

[54] HEMA COPOLYMERS HAVING HIGH OXYGEN PERMEABILITY

[75] Inventors: Martin Rostoker, East Windsor, N.J.; Leon Levine, Willow Grove, Pa.

[73] Assignee: National Patent Development Corporation, New York, N.Y.

[21] Appl. No.: 526,079

[22] Filed: Nov. 22, 1974

Related U.S. Application Data

[63] Continuation-in-part of Ser. No. 431,555, Jan. 7, 1974, abandoned.

[51] Int. Cl.$^2$ .................................. C08F 220/20
[52] U.S. Cl. .................. 260/79.3 M; 260/885; 264/1; 351/159; 351/160; 526/258; 526/264; 526/320
[58] Field of Search ......... 260/79.3 M, 80.75, 86.1 E, 260/885; 264/1; 526/320

[56] References Cited

U.S. PATENT DOCUMENTS

| | | | |
|---|---|---|---|
| 2,412,476 | 12/1946 | Semegen | 260/86.1 E |
| 2,594,560 | 4/1952 | Howard | 260/86.1 E |
| 3,699,089 | 10/1972 | Wichterle | 260/86.1 E |
| 3,780,003 | 12/1973 | Seymour et al. | 260/86.1 E |
| 3,784,540 | 1/1974 | Kliment et al. | 260/86.1 E |

Primary Examiner—Harry Wong, Jr.
Attorney, Agent, or Firm—Cushman, Darby & Cushman

[57] ABSTRACT

Hydrophilic copolymers are prepared of compounds having the formulae:

(1) 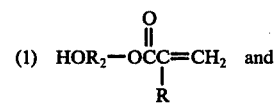 and (2)

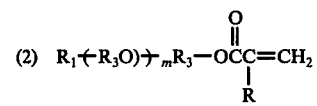

where R is hydrogen or methyl, $R_2$ is alkylene of 2 to 3 carbon atoms, $R_1$ is alkoxy of 1 to 6 carbon atoms, $R_3$ is alkylene of 2 to 3 carbon atoms and $m$ is an integer of 2 to 6. The preferred copolymers are hydroxyethyl methacrylate-methoxytriethyleneglycol methacrylate copolymers. The products are characterized by having an unusually high oxygen permeability compared to other hydrophilic polymers and are particularly valuable in making contact lenses.

55 Claims, 1 Drawing Figure

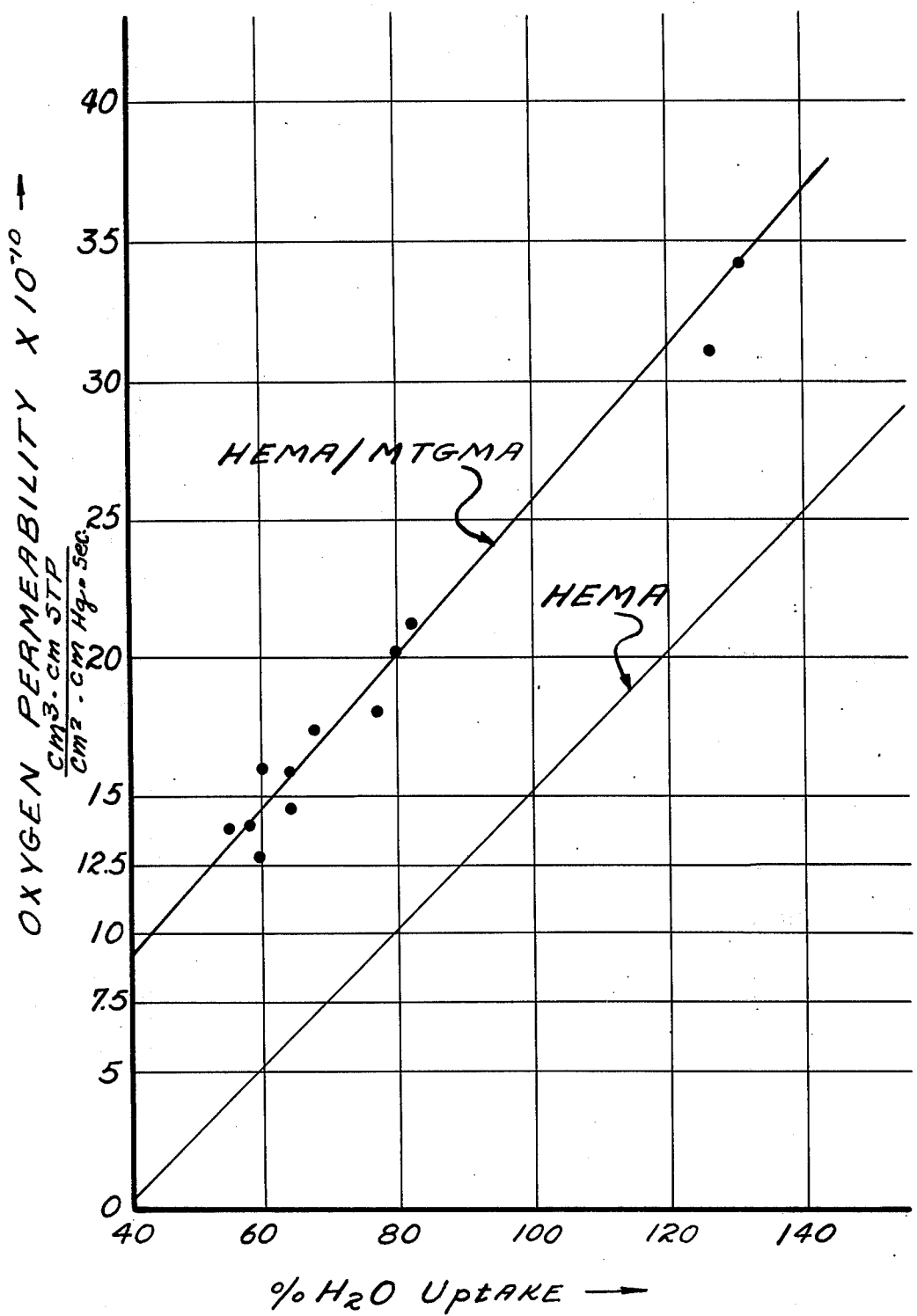

HEMA COPOLYMERS HAVING HIGH OXYGEN PERMEABILITY

This application is a continuation-in-part of application Ser. No. 431,555, filed Jan. 7, 1974 and now abandoned.

The present invention relates to novel water insoluble hydrophilic polymers having improved oxygen permeability and which are especially suitable for preparing contact lenses.

The polymers of the present invention are copolymers of ethylenically unsaturated monomers having the formulae:

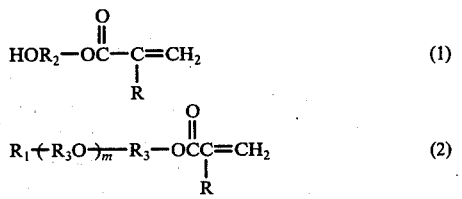

where R is hydrogen or methyl, most preferably methyl, $R_2$ is alkylene of 2 to 4 carbon atoms, preferably from 2 to 3 carbon atoms, most preferably 2 carbon atoms; $R_3$ is alkylene of 2 to 3 carbon atoms, preferably 2 carbon atoms; $m$ is an integer of 2 to 6, preferably 2 to 3, most preferably 2; and $R_1$ is alkoxy of 1 to 6 carbon atoms, preferably 1 to 4 carbon atoms and most preferably 1 carbon atom.

The copolymers contain 97.5 to 25% of monomer (1) and 2.5 to 75% of monomer (2). Preferably they contain 5 to 65% of monomer (2) and more preferably at least 10% of monomer (2).

Examples of suitable monomers within formula (1) are hydroxyethyl methacrylate hydroxypropyl methacrylate, hydroxytrimethylene methacrylate, hydroxyethyl acrylate, hydroxypropyl acrylate and hydroxytrimethylene acrylate.

Examples of suitable monomers within formula (2) are methoxytriethylene glycol methacrylate, methoxytriethylene glycol acrylate, methoxytripropylene glycol methacrylate, methoxytripropylene glycol acrylate, methoxytri(trimethylene glycol) methacrylate, methoxytetraethylene glycol acrylate, methoxy tetraethylene glycol methacrylate, methoxypentaethylene glycol acrylate, methoxypentaethylene glycol methacrylate, methoxyhexaethylene glycol acrylate, methoxyhexaethylene glycol methacrylate, methoxyheptaethylene glycol acrylate, methoxyheptaethylene glycol methacrylate, methoxytetrapropylene glycol acrylate, methoxytetrapropylene glycol methacrylate, methoxy pentapropylene glycol acrylate, methoxypentapropylene glycol methacrylate, methoxyheptapropylene glycol methacrylate, ethoxytriethylene glycol acrylate, ethoxytriethylene glycol methacrylate, ethoxytetraethylene glycol acrylate, ethoxytetraethylene glycol methacrylate, ethoxytetrapropylene glycol methacrylate, ethoxytetrapropylene glycol acrylate, ethoxypentaethylene glycol methacrylate, propoxytriethylene glycol acrylate, propoxytriethylene glycol methacrylate, butoxytriethylene glycol acrylate, butoxytriethylene glycol methacrylate, butoxytetraethylene glycol acrylate, butoxytetraethylene glycol methacrylate, butoxyhexaethylene glycol acrylate, butoxytripropylene glycol methacrylate, amyloxytriethylene glycol acrylate, amyloxytriethylene glycol methacrylate, amyloxytripropylene glycol acrylate, hexoxytriethylene glycol acrylate, hexoxytriethylene glycol methacrylate, hexoxytripropylene glycol methacrylate, hexoxy tetraethylene glycol methacrylate.

Some of the compounds within formula (2) are new compounds. Whether new or old they can be prepared by conventional procedures for preparing esters, e.g., by reacting acrylic acid or methacrylic acid with the appropriate alkoxy polyalkylene glycol or by transesterification of methyl or ethyl acrylate or methacrylate with the appropriate alkoxy polyalkylene glycol. Thus, methoxytriethylene glycol methacrylate can be prepared by reacting methoxytriethylene glycol with methacrylic acid in the presence of an acid catalyst, e.g., sulfuric acid, preferably in the presence of a polymerization inhibitor such as hydroquinone, or it can be made by transesterifying methyl methacrylate with methoxytriethylene glycol in the presence of an acid catalyst, e.g., sulfuric acid, preferably in the presence of a polymerization inhibitor such as hydroquinone.

Thus, there can be used the procedure shown in Stewart U.S. Pat. No. 2,892,820, column 8, lines 62-74 or as shown in Kirk-Othmer *Encyclopedia of Chemical Technology*, 2nd Ed. (1963) Vol. 1, page 299 and the references cited therein under "Direct Esterification and Ester Interchange."

As is known in the art, hydroxyethyl methacrylate normally contains a small amount, e.g., 0.05 – 0.2% of ethylene glycol dimethacrylate (also called ethylene dimethacrylate) as an impurity. Such dimethacrylate acts as a cross-linking agent. It is within the scope of the present invention to have a cross-linking monomer present either as an impurity in the starting monomers and/or by deliberate addition. The cross-linking monomer can be present in an amount up to 5%, usually not over 2% and preferably between 0.05 and 1%. Most preferably at least 0.1% of cross-linking monomer based on the total monomers by weight.

Typical examples of suitable cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, divinyl benzene, divinyl toluene, diallyl tartrate, allyl pyruvate, allyl maleate, divinyl tartrate, triallyl melamine, N,N'-methylene bis acrylamide, glycerine trimethacrylate, diallyl maleate, divinyl ether, diallyl monoethylene glycol citrate, ethylene glycol vinyl allyl citrate, allyl vinyl maleate, diallyl itaconate, ethylene glycol diester of itaconic acid, divinyl sulfone, hexahydro-1,3,4-triacryltriazine triallyl phosphite, diallyl ester of benzene phosphonic acid, polyester of maleic anhydride with triethylene glycol, polyallyl glucose, e.g., triallyl glucose, polyallyl sucrose, e.g., pentaallyl sucrose, sucrose diacrylate, glucose dimethacrylate, pentaerythritol tetraacrylate, sorbitol dimethacrylate diallyl aconitate, divinyl citraconate, diallyl fumarate, glycidyl acrylate, glycidyl methacrylate, allyl methacrylate, allyl acrylate, vinyl methacrylate. The cross-linking agents usually, but not necessarily, have at least two ethylenically unsaturated double bonds.

The novel polymers are obtained via conventional vinyl polymerization procedures, i.e., polymerization across the carbon-to-carbon ethylenic bond. For instance, such polymers can be obtained by bulk polymerization, as aqueous dispersions, by aqueous suspension polymerization, or as solutions in organic solvents such as ethyl alcohol, methyl alcohol, propyl alcohol, isopropyl alcohol, formamide, dimethyl sulfoxide or other appropriate solvent.

Polymerization can be carried out at 20° to 105° C., frequently 35° to 40° C. to 90° C. The polymerization can be carried out employing a catalytically significant quantity of a free radical catalyst, e.g., from 0.05 to 1 percent based on the total weight of polymerizable monomers. Typical catalysts include t-butyl peroctoate, benzoyl peroxide, isopropyl percarbonate, 2,4-dichlorobenzoyl peroxide, methyl ethyl ketone peroxide, cumene hydroperoxide, and dicumyl peroxide. Irradiation, e.g., by ultraviolet light or gamma rays, can also be employed to catalyze the polymerization reaction. Polymerization can also be carried out in conventional manner as shown in Wichterle U.S. Pat. No. 2,976,576, Wichterle 3,220,960, Wichterle 3,361,858, Wichterle 3,699,089, Shepherd U.S. Pat. No. 3,577,518, Gould U.S. Pat. No. 3,641,237, Shepherd U.S. Pat. No. 3,761,286, Stoy U.S. Pat. No. 3,691,263 and Wichterle 3,496,254, for example.

Those novel polymers which are prepared in the presence of water are hydrogels. Those polymers which are not prepared in the presence of water can be converted to hydrogels, if desired, simply by contacting them with water, e.g., by soaking them in water. The anhydrous polymers can be used as such for many purposes, e.g., they can be machined into lenses or employed to entrap fragrances, medicines, etc., with better shelf-life than hydrogels containing such materials.

The new polymers of the invention have high water uptake and higher oxygen permeability values than hydrogel materials presently available. The relatively low oxygen permeability of the presently commercially available hydrophilic contact lenses does not permit as long a wearing time as is desired. The high permeability and water uptake values of the new polymers of the invention make them extremely useful in preparing hydrophilic contact lenses. As a result of the increased oxygen permeability novel contact lenses made from the novel polymers of the present invention permit continuous wearing, e.g., several weeks or months.

The novel copolymers can be cross-linked or uncross-linked but usually have a minor amount of cross-linking agent.

Hydrogel contact lenses are made of water insoluble hydrophilic acrylate and methacrylate polymers, which are cross-linked to form a three-dimensional network. In contrast to poly(methylmethacrylate) hard contact lenses, hydrogel contact lenses are permeable to oxygen and metabolites. However, the permeability of contact lenses from previously available polymers is insufficient for normal function of the cornea epithelium. Therefore, it is desirable that the oxygen permeability of hydrogel lenses be improved in order to have significant increases in the wearing times.

Equations have been developed indicating that the prior art hydrogel lenses supply insufficient oxygen to the cornea of some people. Although the hydrogel lenses can be worn by the majority of people for long hours with no discomfort or cornea epithelial swelling, nevertheless, a contact lens with increased oxygen permeability would allow continuous wearing of hydrogel contact lenses by many more people without any problems to the cornea.

A contact lens with high oxygen permeability also must have other desirable characteristics. Some of the important properties of hydrogel contact lenses for these applications are:
1. Good mechanical properties both wet and dry;
2. Hydrophilicity;
3. Good optical properties;
4. Hydrolytic stability;
5. Non-biodegradability;
6. No tissue reactivity;
7. Sterilizable;
8. Reproducibility of manufacture;
9. pH and temperature stability.

Current hard and hydrogel contact lenses do not allow sufficient oxygen to get to the cornea. This lack of oxygen is called hypoxia and causes gro-s edema. This edema is reversible where the hypoxic condition is alleviated. One aspect of increasing the flow of oxygen to the cornea through the lens consists of increasing the water uptake of the lens. The relationship between the water uptake lenses and oxygen permeability of hydrogel lenses presently available can be expressed by the following relationship:

$$O.P. = (25 \times 10^{-10}) (W.U.) - (9.7 \times 10^{-10})$$

where O.P. represents oxygen permeability, and W.U. represents water uptake.

However, this increase is not above sufficient to allow continuous wearing. The new copolymers based on HEMA-MTGMA have significantly greater oxygen permeability. The relationship between oxygen permeability in ($cm^3$.cm (STP)/$cm^2$.cm Hg Sec) and water uptake for these new polymer systems is expressed by the following relationship:

$$O.P. = (27.5 \times 10^{-10}) (W.U.) - (1.75 \times 10^{-10}).$$

This equation has been found to be valid for copolymers containing 2.5 – 75% of methoxytriethylene glycol with the balance hydroxyethylmethacrylate with or without the minor amount of cross-linking agent or other modifying monomers.

At a given water uptake value the oxygen permeability values can be calculated using the above two equations. The following table shows the relationship between water uptake and oxygen permeability for conventional HEMA hydrogels and the new systems containing MTGMA.

TABLE I

| | OXYGEN PERMEABILITY (O.P.) | |
|---|---|---|
| W.U. (%) | COMMERCIAL HYDRON ($\times 10^{-10}$)[1] | HYDROGELS OF THE INVENTION ($\times 10^{-10}$)[1] |
| 60 | 5.3 | 14.75 |
| 100 | 15.3 | 25.75 |
| 140 | 25.3 | 36.75 |
| 180 | 35.3 | 47.75 |
| 220 | 45.3 | 58.75 |
| 260 | 55.3 | 69.75 |
| 300 | 65.3 | 80.75 |

[1] $\frac{cm^3 \cdot cm \ (STP)}{cm^2 \cdot Hg \ Sec}$

Commercial Hydron is a hydroxyethyl methacrylene-ethylene glycol dimethacrylate copolymer containing less than 1% of the dimethacrylate. The new copolymer materials will even satisfy the oxygen requirement of the eye in the closed state. Thus, these new lenses could be worn continuously.

As the amount of methoxytriethylene glycol methacrylate in the copolymer is increased the water uptake increases. The water uptake values in the above table are saturation values. Even with as little as 2.5% MTGMA in the copolymer with HEMA the oxygen permeability is about $7.5 \times 10^{-10}$. Thus even a small amount of MTGMA has a significant effect on increasing the oxygen permeability over that which might be expected.

The single FIGURE of the drawings is a graph of oxygen permeability against % water uptake. The curve labeled HEMA-MTGMA is the plot for the novel hydroxyethyl methacrylate-methoxytriethylene glycol methacrylate copolymer of the invention while the curve labeled HEMA is for the prior art type of hydroxyethyl methacrylate polymers not containing MTGMA.

The increase in oxygen permeability with the copolymers of the invention is attained without the sacrifice of mechanical properties such as elongation, load, modulus, etc. either wet or dry. Contact lenses made from the novel copolymers as stated can remain in contact with the eye of the wearer for longer periods of time that heretofore were not obtainable with commercial contact lenses due to the high O.P. characteristic. This O.P. characteristic is completely unpredictable from the prior art.

Contact lenses made from the copolymers of the invention also have good optical properties, hydrolytic stability and non-biodegradability.

It should be noted that the curve labeled HEMA in the drawings is true not only for hydroxyethyl methacrylate polymers cross-linked with minor amounts of ethylene glycol dimethacrylate, but is also true for hydroxyethyl methacrylate-polyvinyl pyrrolidone copolymer and the other commercial HEMA polymers presently available.

The contact lenses can be made by any of the conventional methods, e.g., by machining of spin casting. When the amount of MTGMA is increased to as much as 75% of the copolymer the product is too soft to shape into a contact lens by machining but it can be shaped into a contact lens by spin casting. As stated, the contact lenses can be made from the copolymers of the invention using conventional techniques. Thus, there can be used the procedures disclosed in any of the following U.S. Pat. Nos.:

3,361,858 Wichterle, 3,408,429 Wichterle, 3,476,499 Wichterle, 3,488,111 Isen, 3,498,254 Wichterle, 3,499,862 Wichterle, 3,542,907 Wichterle, 3,557,261 Wichterle, 3,660,545 Wichterle, 3,691,263 Stoy, 3,699,089 Wichterle.

While the novel copolymers are preferably employed to prepare novel contact lenses they can also be employed for any of the other uses for which water insoluble hydrophilic polymers can be used. Thus, they can be used to make novel dialyzer diaphragms, to prepare novel artificial kidneys and other novel implants and novel prosthetic devices and all of the other uses disclosed in Wichterle U.S. Pat. Nos. 2,976,576 and Wichterle 3,220,960. They can be used to make novel fragrance releasing flowers and other novel articles in Gould U.S. Pat. No. 3,400,890. They can be used in preparing novel therapeutic containing bandages as disclosed in Shepherd U.S. Pat. No. 3,428,043. They can be used as novel tobacco smoke filters as disclosed in Shepherd U.S. Pat. No. 3,470,883. They can be used as novel non-fog coatings on windows, ski goggles, sunglasses, camera lenses, microscope lenses, binoculars, telescope lenses, mirrors, drinking glasses, gun sights, meat and other food wrappers and other uses disclosed in Shepherd U.S. Pat. No. 3,488,215 and Shepherd U.S. Pat. No. 3,515,579. They can be used to releasably entrap medicines, flavors, essences, fragrances, spices, food colors, sweetners and dyes, medical surgical devices, e.g., heart valves, vessel substitutes, intrauterine devices, membranes and other films, dialyzer diaphragms, catheters, mouth guards, denture liners, boat coatings, tooth brush bristles, nutriant media holders, antiseptic containing bandages, to encapsulate hormones, suture threads and coatings for cotton suture threads, chewing gum additive, toothpaste and all of the other uses disclosed in Shepherd U.S. Pat. Nos. 3,520,949 and Shepherd 3,618,231. They can be used as novel carriers for all of the drugs and having all of the forms, e.g., as gauze dressings, spongy hydrogels, drug implant tablets disclosed in Kliment U.S. Pat. No. 3,551,556. They can be used to modify collagen to make blood vessels, urinary bladders and all of the other uses disclosed in Kliment U.S. Pat. No. 3,563,925. They can be used to make novel catheters as disclosed in Shepherd U.S. Pat. No. 3,566,874. They can be used to apply an essence, cleansing, sanitizing or deodorizing agent to composite fibers and for all the other uses disclosed in Shepherd U.S. Pat. No. 3,567,118. They can be used in novel cosmetic compositions, e.g., to treat hair and for all the other uses disclosed in Shepherd U.S. Pat. No. 3,574,822 for water insoluble products. They can be used to absorb and thereby stabilize vitamins such as ascorbic acid, nicotinamide, calciferol and for all the other uses disclosed in Shepherd U.S. Pat. No. 3,574,826. They can be used to coat boats and other marine structures with or without having an antifoulant releasably entrapped in the coating and for all the other uses disclosed in Shepherd U.S. Pat. No. 3,575,123. They can be used to prepare sustained release tablets containing penicillin or other drugs and for all of the uses disclosed in Shepherd U.S. Pat. No. 3,577,512. They can be used in thin layer chromatography and for all of the other uses disclosed in Chromacek U.S. Pat. No. 3,583,957. They can be used as semipermeable sheets for dialysis, artificial dentures and all of the other uses disclosed in Stoy U.S. Pat. No. 3,607,848. They can be used in flavored drinking straws and all of the other uses disclosed in Guttag U.S. Pat. No. 3,615,595. They can be used to replace gelatin in whole or in part in light-sensitive photographic layers on films, paper and other substrates and all of the other uses disclosed in Stol U.S. Pat. No. 3,620,751. They can be laminated to glass and be used for all of the other uses disclosed in Leeds U.S. Pat. No. 3,621,079. They can be used for preparing a hydrogel layer on glassware or earthenware to aid in printing thereon and for all of the other uses disclosed in Chromacek U.S. Pat. No. 3,632,381. They can be used to impregnate fibrous textile materials to produce an oxygen permeable coating and for all of the uses disclosed in Shepherd U.S. Pat. No. 3,632,416. They can be used to provide an algicide containing coating on the walls or bottom of fish tanks, swimming pools and for all of the other uses disclosed in Guttag U.S. Pat. No. 3,633,546. They can be used to zero order release of pharmaceutically active materials, e.g., in topical, ophthalmic, implant or other drug release systems including all of those disclosed in Gould U.S. Pat.

No. 3,641,237. They can be used in making breathable leather and for all of the other uses disclosed in Shepherd U.S. Pat. No. 3,660,218. They can be used to coat fruit, vegetables and other produce and for all of the other uses disclosed in DeLong U.S. Pat. No. 3,669,691. Their increased ability to breath oxygen can be employed to advantage in this use. They can be used in opthalmic prostheses and for all of the other uses disclosed in Wichterle U.S. Pat. No. 3,679,504. They can be used to entrap drugs for gradual release after oral ingestion and for all of the other uses disclosed in Kliment U.S. Pat. No. 3,689,634. They can be used to improve mascara pigment and for all of the other uses disclosed in U.S. Pat. No. 3,697,643. They can be used as sorbents for telomic plants and algae with or without active filters, e.g., silica gel or activated carbon and for all of the other uses disclosed in Serbus U.S. Pat. No. 3,725,291. They can be used to make printing plates and for all of the other uses disclosed in Takaishi U.S. Pat. No. 3,733,200. They can be used to impart anti-fog properties to regular eyeglasses and for all of the other uses disclosed in Lim U.S. Pat. No. 3,745,042. They can be used in a drug release system in the manner disclosed in Arlen U.S. Pat. No. 3,765,414. They can be used to make capillary drains and for all of the other uses disclosed in Wichterle U.S. Pat. No. 3,767,759. They can be used to entrap microorganisms and for all of the other uses disclosed in Guttag U.S. Pat. No. 3,769,790. They can be used in a device for stitchless connecting the ends of interrupted tubular organs, and all of the other uses disclosed in Lim U.S. Pat. No. 3,774,615. They can be used to prepare a moisture-vapor permeable pressure-sensitive covering and for all of the other uses disclosed in Hodgson U.S. Pat. No. 3,645,835.

While as stated, supra, the preferred copolymer is made by copolymerizing hydroxyethyl methacrylate and methoxytriethylene glycol methacrylate, copolymers prepared from mixtures comprising the various monomers embraced within formulae (1) and (2), supra, with/without minor quantities of cross-linker and/or other modifying monomers contemplated herein can also be used.

The HEMA-MTGMA copolymers employed in the following examples were made by (1) mixing various weight ratios ranging from 100% HEMA to 40% HEMA/60% MTGMA; (2) adding a cross-linking agent, ethylene glycol dimethacrylate (EGDMA) at the indicated level above the small amount already present as an impurity in the starting HEMA; (3) purging the entire mixture with nitrogen in order to remove oxygen (oxygen can be removed by purging using a vacuum pump for 15 to 30 minutes); (4) catalyzing the mixture using isopropyl peroxydicarbonate (IPP) at a concentration from 0.1 to 0.5%, specifically 0.3% based on the total monomer weight; (5) pouring the mixture into fluorocarbon (e.g., polytetrafluoroethylene) treated aluminum molds containing holes. (Films of this material were also prepared by pouring this catalyzed monomer mixture between glass plates paced at a distance of 0.2-0.5 mm.) and (6) curing the resulting polymers at 120° C. for 1.5 hours.

Testing Procedures

Oxygen Permeability

The oxygen permeability method used was the standard procedure used to measure the oxygen permeability of hydrogels (Y. Yasuda and W. Stone, *J. of Polymer Sci.*, 4, 1314–1316 (1966). (A similar procedure is used to measure the permeability of films (ASTM — Volume 27, D1344)).

Water Uptake

The procedure for determining the water uptake of hydrogels was based on ASTM Method Vol. 27, D 570.

Mechanical Properties

Basic textile properties (modules of elasticity, tensile strength, elongation) were determined in the hydrated state on dog-bone shaped specimens on an Instron Model 1130. This method was carried out according to ASTM procedures (Vol. 27, D638).

The results are summarized in Table 2.

TABLE 2

| Sample Composition | Crosslinking Level (EGDMA Added) | Water Uptake | Oxygen Permeability $\times 10^{-10(1)}$ | Elastic Modulus | Ultimate Elongation | Ultimate Load |
|---|---|---|---|---|---|---|
| HEMA/MTGMA 75%/25% | 0.0% | 63.6% | 15.85 | 156.18 lb/in$^2$ | 83.42% | 75.53 lb/in$^2$ |
| " | 0.3% | 59.8% | 16.01 | 195.13 | 31.36 | 50.73 |
| " | 0.5% | 57.9% | 13.97 | 213.53 | 27.00 | 50.86 |
| " | 1.0% | 54.7% | 13.87 | 289.09 | 24.00 | 86.99 |
| HEMA/MTGMA 70%/30% | 0.5% | 63.9% | 14.57 | 224.53 | 31.86 | 56.70 |
| " | 1.0% | 59.0% | 12.74 | 249.37 | 31.99 | 67.87 |
| HEMA/MTGMA 60%/40% | 0.0% | 81.4% | 21.27 | 122.79 | 80.28 | 55.56 |
| " | 0.3% | 79.3% | 20.32 | 155.77 | 72.76 | 57.56 |
| " | 0.5% | 67.4% | 17.47 | 173.73 | 43.9 | 59.89 |
| " | 1.0% | 76.7% | 18.16 | 218.12 | 16.93 | 36.00 |
| HEMA/MTGMA 40%/60% | 0.0% | 129.7% | 34.28 | 75.18 | 75.26 | 39.0 |
| " | 0.3% | 125.4% | 31.21 | 122.33 | 40.77 | 38.6 |

HEMA = Hydroxyethyl methacrylate
MTGMA = Methoxy Triethylene Glycol Methacrylate
EGDMA = Ethylne Glycol Dimethacrylate (1) $\frac{cm^3 \cdot cm \ (STP)}{cm^2 \cdot Hg \ Sec}$ The water uptake of various other HEMA containing polymers is set forth in Table 3 below. The following abbreviations are used in the table:
HEMA represents hydroxyethyl methacrylate;
VP represents vinylpyrrolidone;

DEGMA represents hydroxyethoxyethyl methacrylate or diethylene glycol methacrylate;

Q-1 represents the trimethylammonium chloride hydroxypropyl ester of methacrylic acid having the formula:

SAMPS represents sodium 2-acrylamide-2-methylpropane sulfonic acid of the formula:

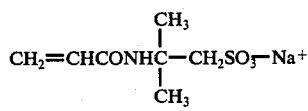

DM represents dimethylacrylamide;

XL indicates the pressure of ethylene glycol dimethacrylate (EGDMA);

The % after XL indicates the amount of EGDMA present based on 100% of the other monomers present. If there is no percentage after XL this indicates that the EGDMA is present only as the impurity in the starting HEMA. Titmus indicates the product is a commercial polymer used by Titmus in its optical lens. Griffen indicates it is a commercial polymer used by Griffin in its contact lenses. Seiderman indicates it is a polymer of the type disclosed in U.S. Pat. No. 3,721,651. The Griffen and Seiderman compositions are discussed in F. J. Hully and M. F. Refozo, *J. of Am. Optometric Ass.*, Vol. 43, pages 11 et seq. (1972) and the HEMA/glycerol methacrylate is disclosed in H. Yasuda, and W. Stone, Jr., *J. of Polymer Science, Part A*1, Vol. 4, pages 2913–2927(1966).

The oxygen permeability and water uptake for all of the systems in Table 3 is plotted in the single FIGURE of the drawings. They make up the lower graph, namely that labelled HEMA. They all conform to equation (1) supra, in oxygen permeability. The term "sparingly cross-linked" is used in the claims in the same manner as described by Otto Wichterle in his patents, e.g., U.S. Pat. No. 3,220,960 and British 829,565.

The terms "copolymer" and "polymer" have oftentimes been used interchangeably throughout the disclosure to mean copolymers or polymers formed via the polymerization of a mixture comprising two or more ethylenically unsaturated compounds. Thus, the novel polymers comprise those obtained via the polymerization of a mixture comprising the monomers designated by the formula (1) and (2) supra with/without a cross-linking agent and/or the modifying monomers or polymers.

TABLE 3

| Polymer System | Composition | Water Uptake % | Oxygen Permeability ($\times 10^{-10}$) |
|---|---|---|---|
| HEMA | Homopolymers XL with EGDMA | 60.0 | 5.0 |
| HEMA/VP | Titmus | 69.0 | 8.5 |
| HEMA/VP | Griffen | 138.0 | 8.5 |
| HEMA/VP | Seiderman | 81.8 | 3.75 |
| HEMA/Glycerol methacrylate | 80%/20% | 77.9 | 10.75 |
| HEMA/Glycerol methacrylate | 67%/33% | 112.7 | 17.0 |
| HEMA/Glycerol | 50%/50% | 173.0 | 23.5 |
| HEMA/Acrylamide | 75%/25%, XL(0.3%) | 138.7 | 25.8 |
| HEMA/Acrylamide | 75%/25%, 1%XL | 116.3 | 20.2 |
| HEMA/Acrylamide | 70%/30%, 1% | 162.9 | 32.0 |
| HEMA/DEGMA | 50%/50% | 101.9 | 15.8 |
| HEMA/Q-1 | 97.5%/2.5 | 70.0 | 6.9 |
| HEMA/Samps/Q-1 | 97.5/1.25/1.25 | 82.0 | 10.2 |
| HEMA/DM | 89%/11%, XL | 74.4 | 10.4 |
| HEMA/DM | 74/26, XL | 161.9 | 30.5 |

Table 4 discloses additional polymeric systems and water-uptake for such systems. These systems conform to equation (1) supra, in oxygen permeability. Additional data is noted in the footnotes of each of said systems.

It will be appreciated that minor amounts of other monomers such as vinylpyrrolidone, vinylacetate, glycerol methacrylate, trimethylolpropane methacrylate, vinyl propionate, sodium 2-acrylamide-2-methylpropane sulfonic acid (SAMPS) and other alkali metal salts thereof, trimethylammonium chloride, hydroxypropyl ester of methacrylic acid (Q-1) and other trialkylammonium chloride derivatives thereof, etc., as well as polymers such as polyvinylpyrrolidone, vinylpyrrolidone/vinylacetate copolymer/polyvinylalcohol, can be present in the monomeric mixture upedrgoing polymerization to produce the novel polymers. Thus, novel polymers can be obtained by polymerizing a mixture containing the monomers of Formulae (1) and (2) with or without a cross-linking agent and with or without other modifying monomers or polymers as illustrated above. In general, small amounts of such modifiers are suitable. Highly suitable polymers comprise at least 50 weight percent of the monomer designated by Formula (1) supra, up to 40 weight percent of the monomer designated by Formula (2) supra, up to 40 weight percent of one or more modifiers such as those illustrated previously, with/without small amounts of a cross-linking agent polymerized therein, based on the total weight of the polymer.

Unless otherwise indicated, all parts and percentages are by weight.

TABLE 4

| | Polymer System | Composition | Water Uptake |
|---|---|---|---|
| (1) | HEMA/MTGMA/DMEAMA/-MAA | 53%/27%/10%/1-0% | 132.4 |
| (2) | HEMA/MTGMA/DMEAMA/-MAA | 60%/30%/5%/5% | 122.3 |

TABLE 4-continued

| | | | |
|---|---|---|---|
| (3) | HEMA/MTGMA/DMEAMA/-MAA | 64%/22%/7%/7% | 114.7 |
| (4) | HEMA/MTGMA/DAA | 63%/32%/5% | 113.7 |

(1) These samples were bulk polymerized with 0.8% diester containing the following two catalysts:
VAZO 64 0.55%
TBPO 0.55%
They were polymerized at 40° C. for 48 hours and post cured at 80° C. for one hour.

(2) Bulk polymerized containing 0.28% diester and two catalysts:
VAZO 64 0.55%
TBPO 0.55%
Bulk polymerized at 50° C. for 24 hours and post cured at 80° C. for one hour.

(3) Bulk polymerized with 0.75% diester containing two catalysts:
VAZO 64 0.57%
TBPO 0.57%
Bulk polymerized at 40° C. for 48 hours and post cured at 80° C. for one hour.

(4) Bulk polymerized with 0.94% of cross-linker and containing 0.66% VAZO 64 and 0.66% TBPO.
Bulk polymerized at 40° C. for 48 hours and post cured at 80° C. for one hour.

DMEAMA = dimethylaminoethyl methacrylate
MAA = Methacrylic acid
DAA = Dimethylacrylamide
VAZO = 2,2'-Azobisbutyronitrile
TBPO = Terbutylperoctoate
Diester = Ethylene glycol dimethacrylate
Cross - linker based on diester based on total monomer

What is claimed is:

1. A hydrophilic, water insoluble copolymer which is (A) a copolymer of 25 to 97.5% of a compound having the formula (1)

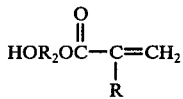

and 75 to 2.5% of a compound having the formula (2)

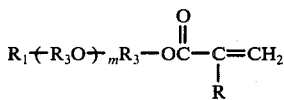

where R is hydrogen or methyl, $R_2$ is alkylene of 2 to 3 carbon atoms, $m$ is an integer of 2 to 6, $R_3$ is alkylene of 2 to 3 carbon atoms and $R_1$ is alkoxy of 1 to 6 carbon atoms or (B) a copolymer of at least 50% of (1), up to 40% of (2), and up to 40% of a modifier selected from the group consisting of vinylpyrrolidone, vinylacetate, glycerol methacrylate, trimethylolpropane methacrylate, vinyl propionate sodium salt of 2-acrylamide-2-methylpropane sulfonic acid, polyvinyl pyrrolidone, vinylpyrrolidonevinylacetate copolymer and polyvinyl alcohol.

2. A copolymer according to claim 1 which has been prepared in the presence of a free radical initiator.

3. A copolymer according to claim 1 which is A and has a water uptake of 60 to 300%.

4. A copolymer according to claim 1 comprising at least 50% of (1), up to 40% of (2), and up to 40% of a modifier.

5. A copolymer according to claim 3 having a water uptake of 54.7 to 129.7%.

6. A copolymer according to claim 5 wherein (1) is hydroxyethyl methacrylate and (2) is methoxytriethylene glycol methacrylate.

7. A copolymer according to claim 1 which is (A) and has been prepared in the presence of a free radical initiator.

8. A copolymer according to claim 1 which is (B) and has been prepared in the presence of a free radical initiator.

9. A hydrophilic, water insoluble copolymer of claim 1 which is (A)
where R is hydrogen or methyl, $R_2$ is alkylene of 2 to 3 carbon atoms, $m$ is an integer of 2 to 6, $R_3$ is alkylene of 2 to 4 carbon atoms and $R_1$ is alkoxy of 1 to 6 carbon atoms.

10. A copolymer according to claim 9 wherein $m$ is 2 to 3 and $R_1$ is alkoxy of 1 to 2 carbon atoms.

11. A copolymer according to claim 10 wherein R is methyl, $R_2$ is alkylene of 2 carbon atoms, $R_3$ is alkylene of 2 to 3 carbon atoms.

12. A copolymer according to claim 11 wherein (1) is hydroxyethyl methacrylate and (2) is methoxytriethylene glycol methacrylate.

13. A copolymer according to claim 12 wherein the methoxytriethylene glycol methacrylate is 5 to 65% of the total of (1) and (2).

14. A copolymer according to claim 13 wherein the methoxytriethylene glycol methacrylate is 10 to 65% of the total of (1) and (2).

15. A copolymer according to claim 14 wherein the methoxytriethylene glycol methacrylate is 40 to 60% of the total of (1) and (2).

16. A copolymer according to claim 12 which has the relationship of oxygen permeability to water uptake satisfied by the equation $$O.P. \text{ in } \frac{cm^3 \cdot cm \text{ (STP)}}{cm^2 \cdot cm \text{ Hg Sec}} = (27.5 \times 10^{-10}) (W.U.) - 1.75 \times 10^{-10}.$$

17. A copolymer according to claim 1 which is a sparingly cross-linked hydrophilic polymer.

18. A copolymer according to claim 17 wherein the cross-linking agent is a polymerizable diester of acrylic acid or methacrylic acid with a glycol or polyalkylene glycol.

19. A copolymer according to claim 17 wherein the cross-linking agent is present in an amount of 0.05 to 5% based on the total of (1) and (2).

20. A copolymer according to claim 19 wherein the cross-linking agent is present in an amount up to 2% of the total of (1) and (2).

21. A copolymer according to claim 20 wherein the cross-linking agent is present in an amount of 0.1 to 1% based on the total of (1) and (2).

22. A copolymer according to claim 17 wherein $m$ is 2 to 3 and $R_1$ is alkoxy of 1 to 2 carbon atoms.

23. A copolymer according to claim 17 wherein R is methyl, $R_2$ is alkylene of 2 carbon atoms, $R_3$ is alkylene of 2 carbon atoms.

24. A copolymer according to claim 23 wherein (1) is hydroxyethyl methacrylate and (2) is methoxytriethylene glycol methacrylate.

25. A copolymer according to claim 24 wherein the methoxytriethylene glycol methacrylate is 5 to 65% of the total of (1) and (2).

26. A copolymer according to claim 25 wherein the methoxytriethylene glycol methacrylate is 10 to 65% of the total of (1) and (2).

27. A copolymer according to claim 26 wherein the methoxytriethylene glycol methacrylate is 40 to 60% of the total of (1) and (2).

28. A copolymer according to claim 24 which has the relationship of oxygen permeability to water uptake satisfied by the equation $$O.P. \text{ in } \frac{cm^3 \cdot cm \text{ (STP)}}{cm^2 \cdot cm \text{ Hg Sec}} = (27.5 \times 10^{-10})(W.U.) - 1.75 \times 10^{-10}.$$

29. A copolymer according to claim 24 wherein the cross linking agent is ethylene glycol dimethacrylate.

30. A copolymer according to claim 29 wherein the ethylene glycol dimethacrylate is present in an amount of 0.1 to 2% of the total of (1) and (2).

31. A copolymer according to claim 9 in dry form.

32. A copolymer according to claim 9 in the form of a hydrogel.

33. A contact lens made of the polymer of claim 9.

34. A contact lens according to claim 33 wherein $m$ is 2 to 3 and $R_1$ is alkoxy of 1 to 2 carbon atoms.

35. A contact lens according to claim 33 wherein R is methyl, $R_2$ is alkylene of 2 carbon atoms, and $R_3$ is alkylene of 2 carbon atoms.

36. A contact lens according to claim 35 wherein (1) is hydroxyethyl methacrylate and (2) is methoxytriethylene glycol methacrylate.

37. A contact lens according to claim 36 wherein the methoxytriethylene glycol methacrylate is 5 to 65% of the total of (1) and (2).

38. A contact lens according to claim 37 wherein the methoxytriethylene glycol methacrylate is 10 to 65% of the total of (1) and (2).

39. A contact lens according to claim 38 wherein the methoxytriethylene glycol methacrylate is 40 to 60% of the total of (1) and (2).

40. A contact lens according to claim 36 which has the relationship of oxygen permeability to water uptake satisfied by the equation $$O.P. \text{ in } \frac{cm^3 \cdot cm \text{ (STP)}}{cm^2 \cdot cm \text{ Hg Sec}} = (27.5 \times 10^{-10})(W.U.) - 1.75 \times 10^{-10}.$$

41. A contact lens according to claim 33 wherein the cross-linking agent is a polymerizable diester of acrylic acid or methacrylic acid with a glycol or polyalkylene glycol.

42. A contact lens according to claim 33 wherein the cross-linking agent is present in an amount of 0.05 to 5% based on the total of (1) and (2).

43. A contact lens according to claim 42 wherein the cross-linking agent is present in an amount up to 2% of the total of (1) and (2).

44. A contact lens according to claim 43 wherein the cross-linking agent is present in an amount of 0.1 to 1% based on the total of (1) and (2).

45. A contact lens according to claim 33 wherein $m$ is 2 to 3 and $R_1$ is alkoxy of 1 to 2 carbon atoms.

46. A copolymer according to claim 45 wherein R is methyl, $R_2$ is alkylene of 2 carbon atoms, $R_3$ is alkylene of 2 carbon atoms.

47. A contact lens according to claim 46 wherein (1) is hydroxyethyl methacrylate and (2) is methoxytriethylene glycol methacrylate.

48. A contact lens according to claim 47 wherein the methoxytriethylene glycol methacrylate is 5 to 65% of the total of (1) and (2).

49. A contact lens according to claim 48 wherein the methoxytriethylene glycol methacrylate is 10 to 65% of the total of (1) and (2).

50. A contact lens according to claim 49 wherein the methoxytriethylene glycol methacrylate is 40 to 60% of the total of (1) and (2).

51. A contact lens according to claim 47 which has the relationship of oxygen permeability to water uptake satisfied by the equation $$O.P. \text{ in } \frac{cm^3 \cdot cm \text{ (STP)}}{cm^2 \cdot cm \text{ Hg Sec}} = (27.5 \times 10^{-10})(W.U.) - 1.75 \times 10^{-10}.$$

52. A contact lens according to claim 4.

53. A copolymer according to claim 4 wherein (1) is hydroxyethyl methacrylate and (2) is methoxytriethylene glycol methacrylate.

54. A copolymer according to claim 4 comprising hydroxyethyl methacrylate as (1), methoxytriethylene glycol methacrylate as (2), and a mixture of the trimethylammonium chloride hydroxypropyl ester of methacrylic acid and the sodium 2-acrylamide-2-methylpropane sulfonic acid.

55. A contact lens according to claim 54.

* * * * *